United States Patent [19]

Sieber-Müller

[11] 4,177,969

[45] Dec. 11, 1979

[54] FLOW CONTROL DEVICE

[76] Inventor: Paul Sieber-Müller, Ebenen, 3703 Aeschi b. Spiez, Berne, Switzerland

[21] Appl. No.: 793,140

[22] Filed: May 3, 1977

[30] Foreign Application Priority Data

May 3, 1976 [CH] Switzerland .......................... 5424/76

[51] Int. Cl.$^2$ ............................................... F16K 7/06
[52] U.S. Cl. ........................................... 251/9; 251/4
[58] Field of Search ..................... 251/4, 6, 9

[56] References Cited

U.S. PATENT DOCUMENTS

| | | | |
|---|---|---|---|
| 3,918,675 | 11/1975 | Forberg | 251/6 |
| 4,034,773 | 7/1977 | Huggins | 251/9 X |

Primary Examiner—Martin P. Schwadron
Assistant Examiner—Richard Gerard
Attorney, Agent, or Firm—Imirie & Smiley

[57] ABSTRACT

A flow control device for controlling the rate of flow of fluid passing through flexible tubing used in particular for intravenous administration sets. The device comprises a body member with a bottom and two side walls defining a tubing receiving channel. The side walls are provided with aligned bearings journalling pivot means pivotally supporting a lever having at one end a semi-circular cam-like clamping disk substantially concentric with the pivot means. One edge of the leading portion or initial tube engaging clamping surfaces of said disk is rounded with the radius of curvature of said edge decreasing continuously, forming thus a clamping surface which will, upon movement of the lever, first collapse and deform the tubing into a L-shaped cross-sectional configuration and then press together the horizontal and then continuously the vertical part of the tubing. This device provides for an easily adjustable and unvarying flow rate.

5 Claims, 6 Drawing Figures

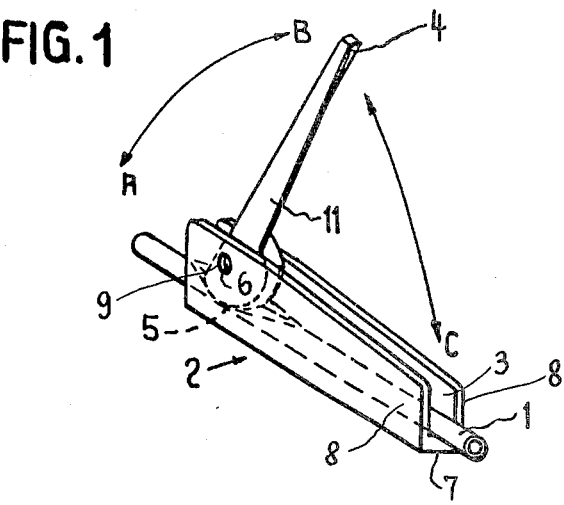
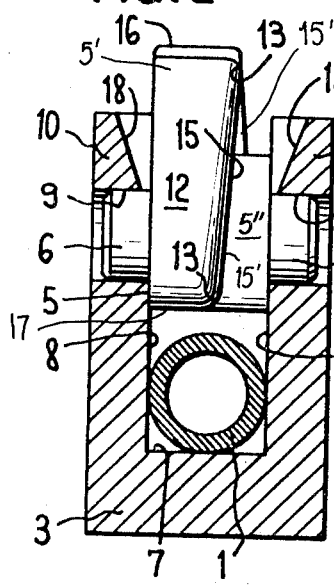
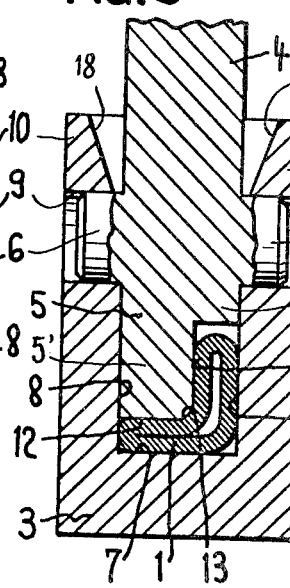
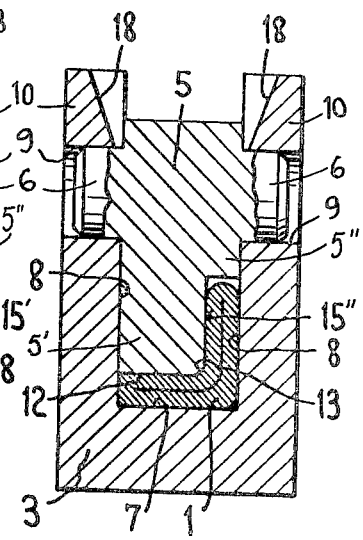

FLOW CONTROL DEVICE

BACKGROUND OF THE INVENTION

This invention relates to a flow control device for controlling the rate of fluid passing through flexible tubing, used in particular in medicine, for example for intravenous administration sets.

Various types of such devices are known in the prior art, whereby the plurality of those devices comprise a body member and as clamping means a roller, said roller being guided generally in grooves or slits arranged in an oblique relation to the bottom of the body member, for example as disclosed in the U.S. Pat. Nos. 3,630,481 and 3,900,184. The fine adjusting of the flow rate is rather difficult with such rollers and the problems due to the cold flow of the tubing are not overcome by the form of the body member and clamping surface of the roller.

U.S. Pat. No. 3,861,641 discloses a hose clamp comprising a body member with a rectangular opening or recess and an excentric lever, pressing the tubing into said opening. This device could also not solve the problem of cold flow because the tubing retracts into said opening if the lever is not closed completely.

SUMMARY OF THE INVENTION

The present invention solves the above problems and provides a flow control device which can be adjusted easily and exactly and which avoids the cold flow of the tubing and therefore provides a constant flow rate. The device has a simple construction suited for mass production.

The flow control device of the present invention comprises a body member for receiving a flexible tubing and having a flat bottom and two flat side walls, the distance between said walls corresponding substantially to the diameter of said tubing, and axially aligned bearings formed in said side walls for pivotally supporting a lever for collapsing the tubing. The lever has at one end two pivots journalled in said bearings and a semi-circular clamping disk centered with said pivots, said disk having a semi-circular press surface and a generally radial or side press surface. A portion of the edge between the semi-circular press surface and said side press surface of said clamping disk being rounded.

The radius of curvature of said rounded edge decreases continuously from the leading end of said disk, which initially contacts and compresses the tube, to the area of the middle of the circumference of said disk and the width of the initial circular press surface of said disk increasing in width accordingly. The thus formed clamping surface of the disk, by moving the lever from the open to the closed position, causing first a collapsed deformation of the tubing into an L-shaped cross-sectional configuration by pressing together the horizontal component of the L-shaped tubing and then progressively pressing together the vertical part of the collapsed tubing to thereby control the rate of flow through the tubing.

BRIEF DESCRIPTION OF THE DRAWINGS

FIG. 1 is a perspective view of a flow control device with tubing disposed therein according to the invention;

FIGS. 2 to 4 are sectional views of three successive phases of the clamping process;

DESCRIPTION OF THE PREFERRED EMBODIMENT

Figure 5:
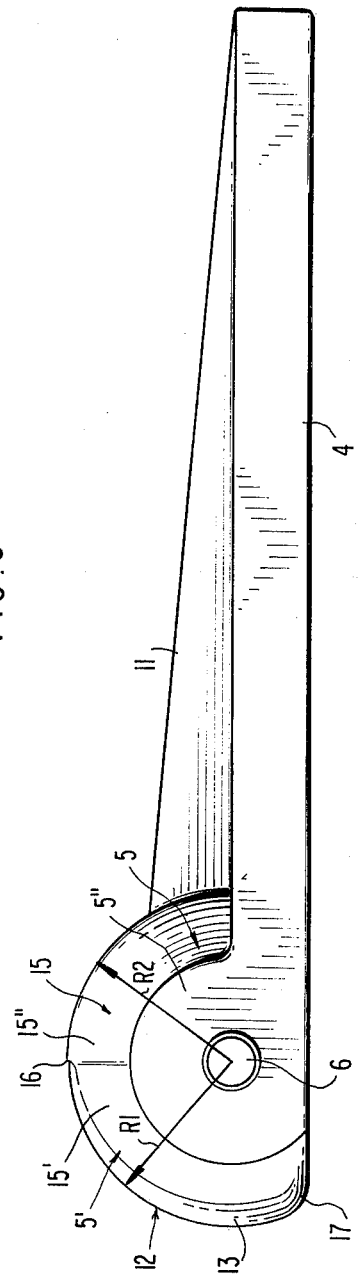
FIG. 5 is a side view in elevation of the lever of FIG. 1.
Figure 6:
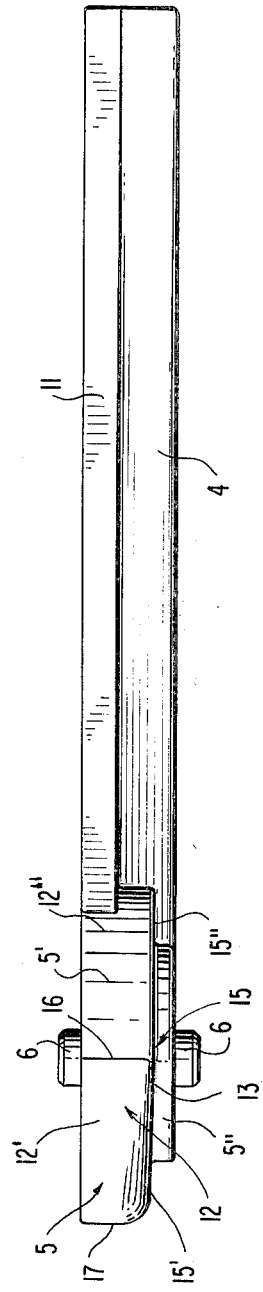
FIG. 6 is a plan view of the lever of FIG. 5.

Referring to FIG. 1, a flow control device according to the invention, comprises a body member 2 defining a tube-channel 3, for receiving or nesting a tubing 1, and a lever 4 having a semi-circular clamping disk 5 and oppositely extending pivots 6, centered with the disk 5, is journalled by said pivots in axially aligned bearings 9 of the body 2. Lever 4 is reinforced by a flange like reinforcement 11. From the FIGS. 2 to 4 it can be seen that the tube-channel 3 is defined by a flat base 7 and two parallel flat side walls 8 and that the distance between the walls corresponds substantially exactly to the diameter of the tubing 1.

The pivots 6 of the lever 4 are pivotally journalled in said axially aligned bearings 9 formed in upper portions 10 of side walls 8 of the body member 2, which wall portions 10 are tapered or inclined from the bearings 9 towards the upper outer edges of said walls 10, forming grooves 18. This tapering and the elasticity of the body member, made of plastic materials, permits spreading of the walls to introduce the lever pivots 6 into the bearings 9, over the inclined grooves 18.

FIGS. 3 and 4 show the effective clamping surfaces 12 and 15 of clamping disk 5. The disk 5 includes the clamping disk body 5' of semi-circular configuration bounded by the curved or semi-circular press surface 12 and a hub portion 5" surrounding the adjacent pivot 6 to space the transverse-axis press surface 15 from the adjacent channel wall 8. The semi-circular press surface 12 includes a segment 12' that initially engages the tube 1 and a segment 12" that finally engages the tube. The edge 13 of the disk 5 between the segment 12' of the press surface 12 and the side surface 15 is rounded, and the radius of curvature of said edge decreases continuously from the rounded leading or initial tube engaging end 17 to about the middle of the circumference of the semi-circular press surface FIG. 5.

The clamping surface 15 includes a planar initial press surface 15' which is inclined to the perpendicular to the axis of rotation and engages or progressively collapses the vertical portion of the collapsed tubing, to control reduced volume flow through the tube, and a planar final clamping surface 15" that is perpendicular to the pivotal axis and completely closes the tube 1. The width of the leading or initial tube-engaging component of the clamping surface 12 increases from the end 17 continuously so that in the closed position of the lever the distance between the recessed angularly disposed component 15" of the clamping surface 15 and the adjacent side wall 8 of the tube-channel is less than the double wall thickness of the tubing.

Preferably, this distance is 0.8 times the double wall thickness. The radius of the clamping disk is chosen so that the distance between the press surface 12 of the semi-circular surface and the base of the tube-channel is also 0.8 times the double wall thickness of the tubing. In order to increase the security and to have a supplemental control, the leading segment or component clamping surface 12', which segment completely collapses the horizontal portion of the L-shaped tubing, and the remaining part is divided by a step or stop 16. The clamping surface 12 has a curvature radius R1 of the surface 12' preceeding step or stop 16 and a radius R2 for the segment 12" succeeding the step or stop 16.

FIGS. 2 to 4 demonstrate the clamping and collapsing of the tubing. In position A, FIG. 1, the lever is in a completely opened position, as shown in FIG. 2. In FIG. 3 the lever is vertical and in position B, FIG. 1, and the tubing has already assumed a right angular cross-sectional configuration, that is the shape of an "L," the horizontal part of the tube being compressed and closed. At this point the control of the flow rate has become effective. In this position the flow rate is in the range of some drops per second, depending of course on the dimensions of the tubing and the clamp. By turning the lever towards position C, FIG. 1, the vertical part of the tubing is increasingly compressed, the variable radius of curvature of the rounded edge 13 enabling the continuous and exact control of the flow rate.

The assembling of the device is very simple: the tubing 1 is laid into the tube-channel 3 and the pivots 6 of the lever 4 are inserted into the grooves 18 and pushed inwardly of the channel until the pivots 6 mate into the bearings 9. The lever 4 is brought into position B and the flow rate can be adjusted. If the flow of the fluid has to be stopped completely the lever must be turned at least to the step or stop 16 and should be secured by turning beyond said step or stop.

Advantageously the device is made of a suitable plastic material, whereby the simple construction of the two parts contribute essentially to its economic fabrication.

I claim:

1. A flow control device for controlling the rate of flow of fluid passing through flexible tubing, comprising: a body member comprising a flat bottom and two substantially parallel spaced flat side walls defining a channel for receiving a flexible tubing, said side walls having a pair of axially aligned bearings respectively, a lever including at one end a semi-circular clamping disk for collapsing the tubing, and pivot means supporting said one end portion of said lever in said bearings for pivotal operation of said disk for clamping and selectively collapsing the tubing in said channel to regulate flow therethrough, said semi-circular clamping disk including a substantially semi-circular body of a width less than the spacing between said channel side walls, and a hub portion on at least one side of said semi-circular body and jointly therewith equaling the spacing between said side walls to snugly fit said lever one end portion within said channel body, said semi-circular body having a semi-circular perpheral press surface concentric with said pivot means and being spaced from said channel bottom wall, when in facing relation, a distance substantially equal to the double thickness of the tube wall to collapse and close the horizontal branch of an L-shaped collapsed tube, one generally radial side wall of said semi-circular body being spaced by said hub from the adjacent channel side wall a distance substantially equal to the double thickness of the tube wall and having a configuration to progressively collapse and close the vertical branch of an L-shaped collapsed tube.

2. A flow control device according to claim 1 wherein said hub extends only from said generally radial side wall of said semi-circular body, the side wall of said semi-circular body opposite said generally radial side wall being planar and extending perpendicular to the axis of said pivot means and engaging the adjacent channel side wall to enable said semi-circular press surface to completely compress the free edge portion of the horizontal branch of the collapsed tube, said generally radial side wall including a portion for initially engaging said tube and being inclined to the axis of said pivot means to progressively collapse the vertical branch of the collapsed L-shaped tube, the remainder of said generally radial side wall being planar and disposed perpendicular to the axis of said pivot means to retain said vertical branch of said tube in collapsed, closed position, the periphery of said hub being spaced from said channel bottom wall a distance sufficient to accommodate the compressed free edge of said vertical branch.

3. A flow control device according to claim 2 wherein said semi-circular body has a generally flat surface opposite said semi-circular press surface with said surfaces joining at one end for initial contact with the tube, the juncture of said surfaces being curved to define a nose for initially engaging the tube without damage thereto, the juncture of said inclined side press surface with said semi-circular press-surface providing a progressively widening wedge shape to the corresponding portion of said semi-circular press surface and said latter juncture being rounded on a radius that progressively decreases from said nose to said radial perpendicular side press surface to progressively compress the angle between the horizontal and vertical branches of the collapsed L-shaped tube.

4. A flow control device according to claim 3 wherein said semi-circular press surface comprises a stop-step in the vicinity of the juncture of said inclined and radial side press surfaces to preclude accidental movement of said lever from the position in which the tube is fully closed.

5. A flow control device according to claim 4 wherein the spacing of said semi-circular press surface from the channel bottom wall and the spacing between the radial side press surface and the adjacent channel side wall each is less than the double thickness of the tube wall to squeeze together the tube walls and tightly close the tube.

* * * * *